United States Patent
Naimark et al.

[11] Patent Number: 5,189,402
[45] Date of Patent: * Feb. 23, 1993

[54] CONTENT ADDRESSABLE VIDEO SYSTEM FOR IMAGE DISPLAY

[75] Inventors: Michael Naimark; Kenneth M. Carson, both of San Francisco, Calif.

[73] Assignee: Advanced Interaction, Inc., San Francisco, Calif.

[*] Notice: The portion of the term of this patent subsequent to Aug. 15, 2006 has been disclaimed.

[21] Appl. No.: 356,543

[22] Filed: May 24, 1989

Related U.S. Application Data

[63] Continuation of Ser. No. 50,196, May 14, 1987, Pat. No. 4,857,902.

[51] Int. Cl.⁵ .............................................. G06F 3/033
[52] U.S. Cl. ..................................... 340/709; 340/724; 358/103
[58] Field of Search ............... 340/707, 708, 709, 710, 340/711, 712, 725, 995, 990, 724; 358/104; 434/62, 69

[56] References Cited
U.S. PATENT DOCUMENTS 4,045,789  8/1977  Bristow ................. 340/725
4,121,283 10/1978  Walker ................... 340/709
4,661,811  4/1987  Gray et al. .............. 340/995
4,857,902  8/1989  Naimark et al. ......... 340/709

FOREIGN PATENT DOCUMENTS 0018262  7/1986  European Pat. Off. ............ 340/710

Primary Examiner—Alvin E. Oberley
Assistant Examiner—Kara Farnandez
Attorney, Agent, or Firm—Fliesler, Dubb, Meyer & Lovejoy

[57] ABSTRACT

An interactive video display system with tight coupling between user-input and the images displayed to provide a feeling of real control by the user. A library of frames of video data is stored in randomly accessible data locations, such as an optical video disc. The video data in each frame in the library is assigned a virtual position in a pre-defined data space, such that the visual image in each frame is related to visual images in other frames by virtual position in the data space. User input is provided through track ball or mouse generating displacement signals. The input signal is translated to an updated virtual position in the data space relative to a previous virtual position and the next frame having the updated virtual position is displayed next.

6 Claims, 5 Drawing Sheets

CONTENT ADDRESSABLE VIDEO SYSTEM FOR IMAGE DISPLAY

This is a continuation of Ser. No. 07/050,196, filed May 14, 1987 now U.S. Pat. No. 4,857,902.

BACKGROUND OF THE INVENTION

Limited Copyright Waiver

A portion of the disclosure of this patent document contain material which is subject of copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The present invention relates to a system displaying visual images in sequences generated by user-interactivity. In particular, the present invention provides for generating a sequence of visual images in response to the position of an object.

2. Description of Related Art

Motion pictures, or movies, consist of sequences of images related to one another by chronological order, the difference between each frame being an incremental change over time of the subject of the movie. Movies typically are stored in a medium such as film, video tape, or optical video disc as a library of pre-defined frames of image data. The viewer passively views the movie, having no ability to control the sequence of images presented. The existing technologies have evolved, therefore, to display movies in predefined time-based order providing the viewer with no control over the sequence of frames displayed.

Display technologies have developed to provide for speeding up, slowing down or stopping the motion of a movie by changing the speed of access of new visual images from the storage medium. This type of user control virtually speeds up, slows down or stops time in the movie, but does not change the sequence of visual images displayed. In addition, to the standard speed control on video display systems, some video machines provide "jog controls" which allow a user to step through the images in a movie one frame at a time.

User interactive systems such as the movie map have been developed, but have had limited success in providing user input for controlling the sequence of images that creates a feeling of real time interaction. Examples of the movie map include the Aspen, Colorado project which is described in a doctoral thesis entitled "Cognitive Space in the Interactive Movie Map: An Investigation of Spatial Learning in Virtual Environments", by Robert Mohl, 1981, submitted at the Massachusetts Institute of Technology. In addition, applicant is aware of movie maps which have been created of Paris, France for exhibition by the Paris Metro, and of the Polenque ruins in Mexico, funded by RCA and done by the Bank Street College of New York City. In each of these movie map systems, the user is provided with control switches to adjust the apparent speed of motion along displayed streets or pathways filmed at real places. Further, the system provides for the ability to go forward or backward down the streets. At intersections, the user can select a direction in order to turn left or right. These movie maps give the user control over the direction and rate of apparent motion through the places represented by the library of video frames provided using a joystick or buttons to control display mode on video optical disc players. The Aspen movie map gives the user a map of Aspen and an indicator which locates the displayed frame on the map to provide a "you are here" effect.

Other systems using rate and direction input to traverse a library of video frames include simulators such as vehicle flying or driving simulators.

Another prior art form of interactive video display similar to the movie map is described in the master's thesis entitled "Viewpoint Dependent Imaging: An Interactive Stereoscopic Display", by Scott Fisher, submitted to the Massachusetts Institute of Technology, 1981. The viewpoint-dependent imaging system tracks the position of a viewer's head to control the display of images. The images are organized in sequences to mimic changes in perspective correlating with motions of the viewer's head as constrained by the stored sequences. As the viewer's head moves with respect to the display screen, the image on the display changes to reflect the changing viewpoint. In practice, the viewpoint-dependent imaging system actually uses detected position of the viewers' head to control the rate and sequence of frame access to traverse the stored sequences to a frame matching the viewer's actual position. Because of the discrete rates of frame access, there is a decoupling effect between the motion of the viewer's head and the actual images displayed. Unlike the driver of a real car who, when he turns the steering wheel causes the car to turn instantly, the image in discrete rate-dependent interactivity systems lags the user inputs or does not match them. Thus, when the user stops, the visual image continues to change for a perceptible interval until the image displayed catches up with the actual detected position of the viewer's head. Another decoupling effect arises because the stored images are created based on a pre-selected set of perspectives and the viewer's head will only rarely be located precisely at a position corresponding to one of the perspectives, and because the image is limited to prefilmed perspectives. Thus, to the extent that the viewer's head is not located at a position having a corresponding stored image, a perceptible skew is observed in the alignment of the displayed sequence of images with the real position of the viewer's head. These decoupling effects cause the interactivity to feel artificial to the user. In order to overcome these and other problems, recent viewpoint-dependent systems have used computer generated graphics. See S. S. Fisher, et al., "Virtual Environment Display System", ACM 1986 Workshop on Interactive 3D Graphics, Oct. 23-24, 1986, Chapel Hill, N.C.

Other interactive display systems have been created using computer-generated graphics. For instance, a graphic designer for an automobile can display interactively several viewpoints of the automobile being designed using keyboard control. However, in such computer-generated graphic systems, the entire, or a substantial amount of the graphic image is re-calculated during each frame update to present the change of perspective. There is no large library of video frames that is traversed in response to the user inputs. These prior art computer-generated graphic systems provide powerful user interactivity but require powerful, fast computers which are beyond the reach of most users. Further, to provide quality video images, comparable to those obtainable by pre-created frames of video data or images created by video camera and stored on a medium such as optical video disc, the quantity of data to be re-calculated for each frame is prohibitive.

SUMMARY OF THE INVENTION

The present invention provides an apparatus for interactive display of visual images with tight coupling between user-input and the images displayed that provides a feeling of real-time interaction by the user in traversing a library of video frames. The apparatus comprises a display means, responsive to frames of image data for displaying the visual images. A means for storing a library of frames of image data in randomly accessible data locations is included, such as an optical video disc. Accessed frames of image data are supplied to the display means for display. The image data in each frame in the library is assigned a virtual position in a pre-defined data space, such that the visual image in each frame is related to visual images in other frames by virtual position in the data space. An input means is provided for generating input signals indicating the displacement of an object such as a track ball or mouse. The input signal is translated to an updated virtual position in the data space in update intervals relative to a previous virtual position and to a next frame address of a data location storing a frame having the updated virtual position for each interval. The next frame address is supplied to the storing means to cause display of the next visual image.

In one aspect of the invention, the data space is graphically represented by a set of interconnected line segments such as a grid, cladogram, tree or map. The set of line segments is displayed to the user and the virtual position of the image being displayed is identified as a point on one of the line segments to the user. Thus, as the user generates displacement signals, such as by moving a track ball, both the virtual position on the graph of the data space and the visual image are updated. Through interactivity, the user learns to correlate the displacement of the input device with a change from one virtual position in the data space to another virtual position providing a tightly coupled apparatus for traversing the library of video frames.

By giving the user direct control over virtual position in the data space, the present invention overcomes the inability of the prior art to create within the user a feeling of real interaction using position detecting input devices. Further, the position displacement input device provides the ability to traverse an arbitrary data space of practically unlimited size.

DESCRIPTION OF THE PREFERRED EMBODIMENT

Figure 5:
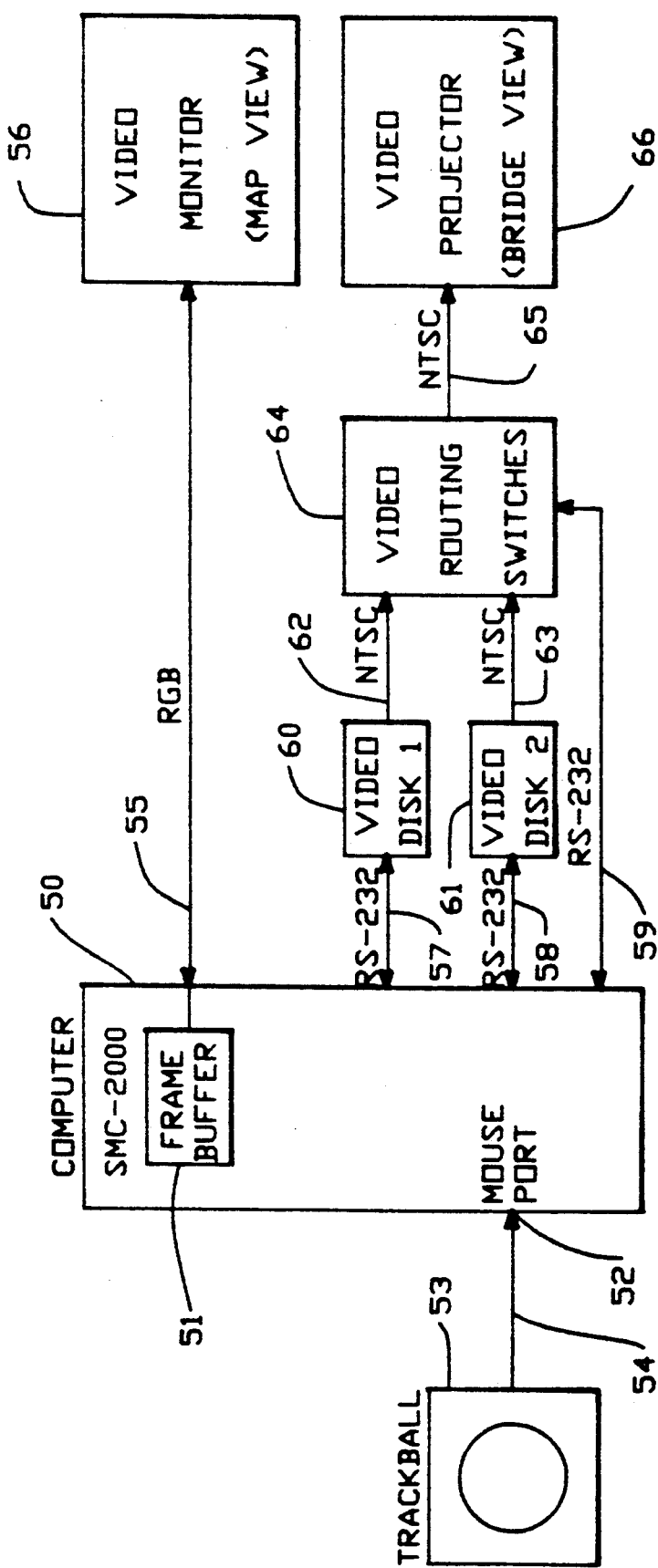
FIG. 5 is a block diagram of the interactive display system according to the present invention.
Figure 6:
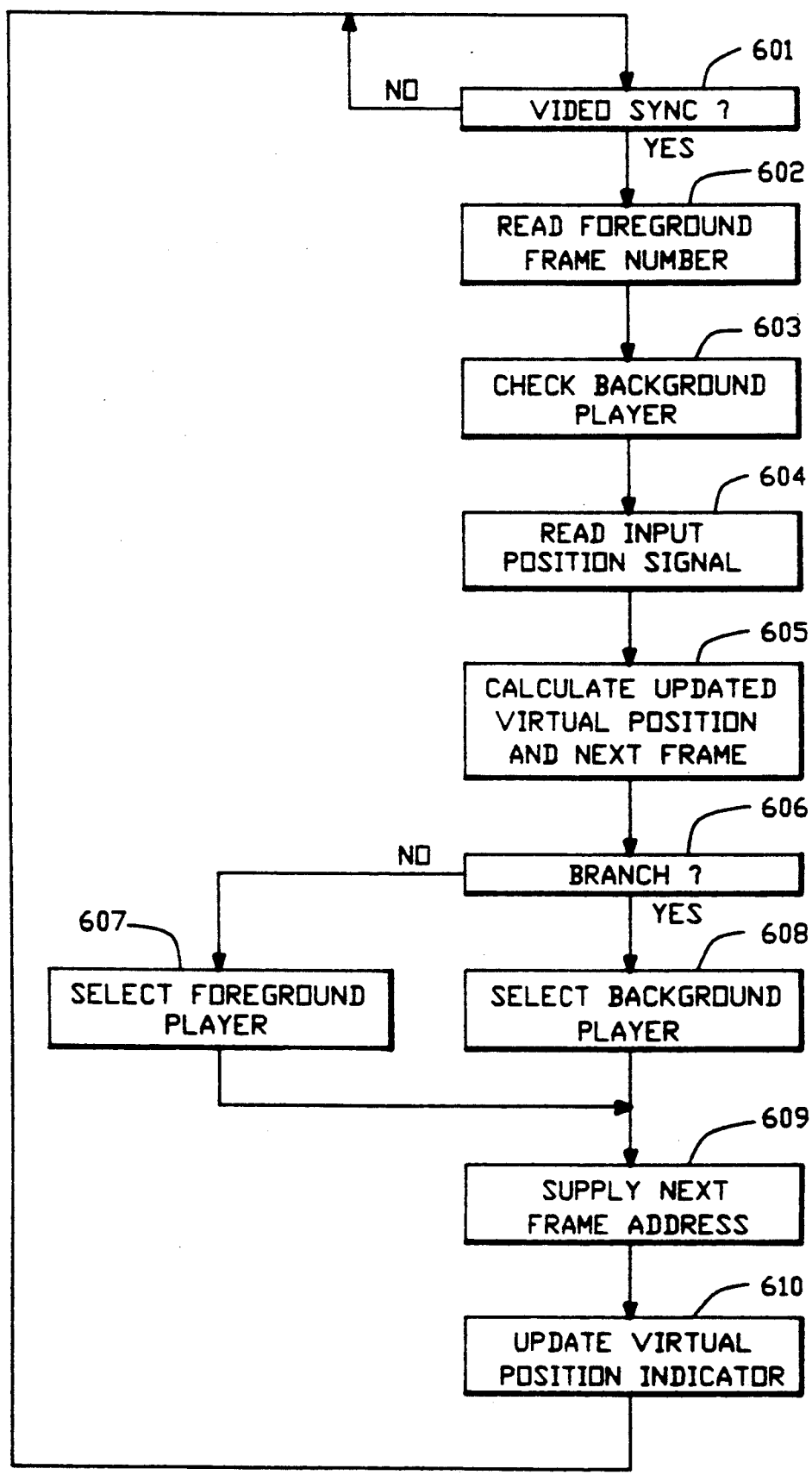
FIG. 6 is a flowchart illustrating the control sequence for the system of FIG. 5.
Figure 7:
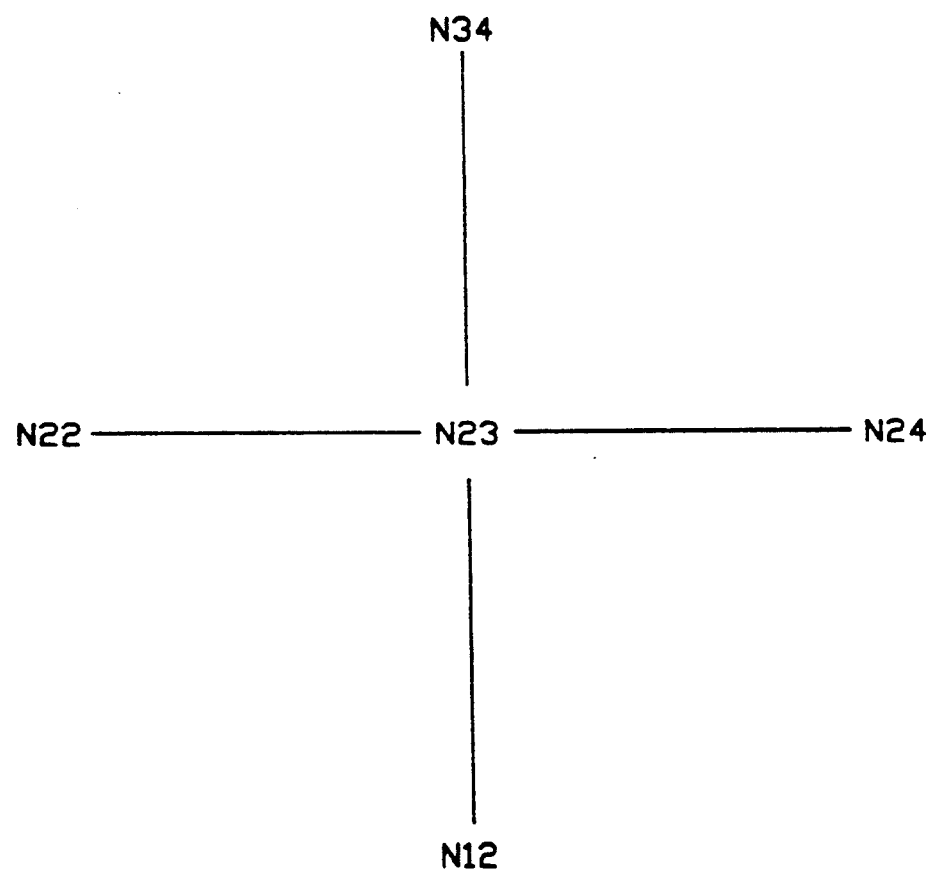
FIG. 7 is a diagram of intersecting segments in a data space.

A detailed description of the preferred embodiment of the present invention is provided with reference to the figures. First, with reference to FIGS. 1-4, the organization of an arbitrary data space is described, where each point in the data space is represented by a visual image to be displayed and visual images in the data space are related to one another by their virtual positions in the data space. With reference to FIGS. 5, 6 and 7, a system for displaying the visual images from the data space in response to the displacement signals generated by a user is described.

A. The Data Space

Figure 1:
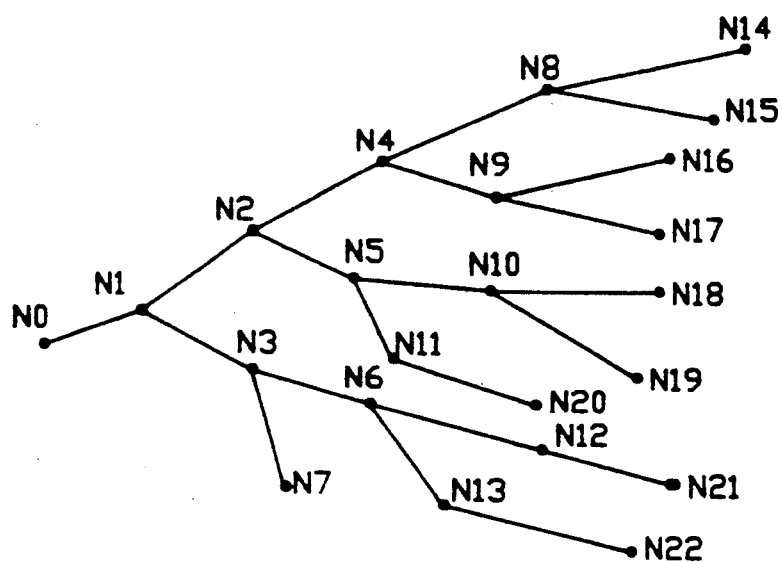
FIG. 1 is a diagram of a cladogram defining a data space.
Figure 3:
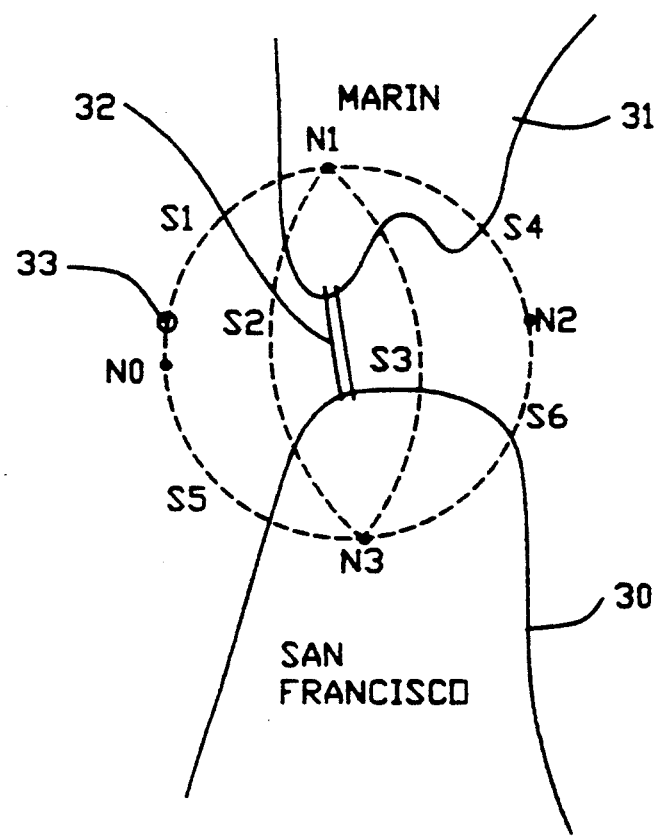
FIG. 3 is a diagram of data space consisting of a mesh of segments overlaying the Golden Gate bridge of San Francisco Bay.
Figure 4:
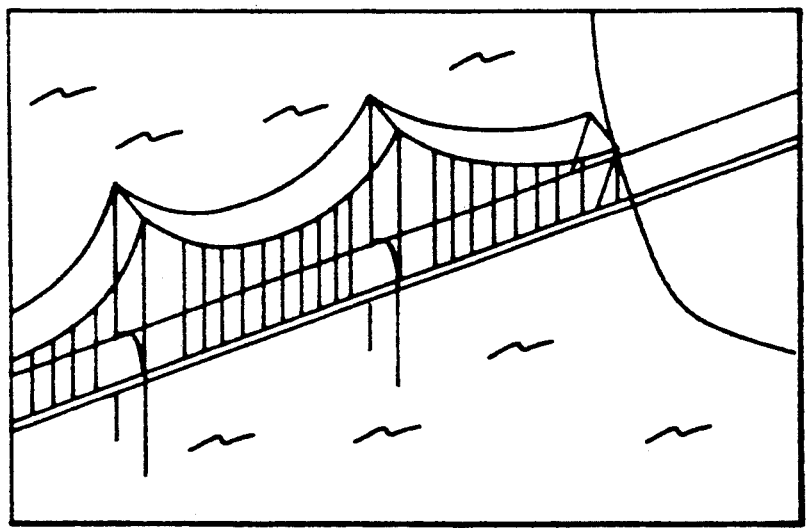
FIG. 4 is an example of a video image having a virtual position on the data space of FIG. 3.

FIGS. 1 and 3 are examples of arbitrary data spaces suitable for implementations of the present invention. FIG. 1 is a cladogram such as might be used to show the evolutionary tree of selected animals. Each node, N0 through N22, on the cladogram in the example in FIG. 1 represents a branch point in the evolutionary tree from which a particular life form evolved along two or more branches. The points along line segments between the nodes correspond to a series of visual images illustrating the evolution from the life form at the node of one end of the segment to the life form at the node of the other end of the segment. Thus, the visual images in the data space are related to one another by their virtual position on the cladogram of FIG. 1.

Figure 2:
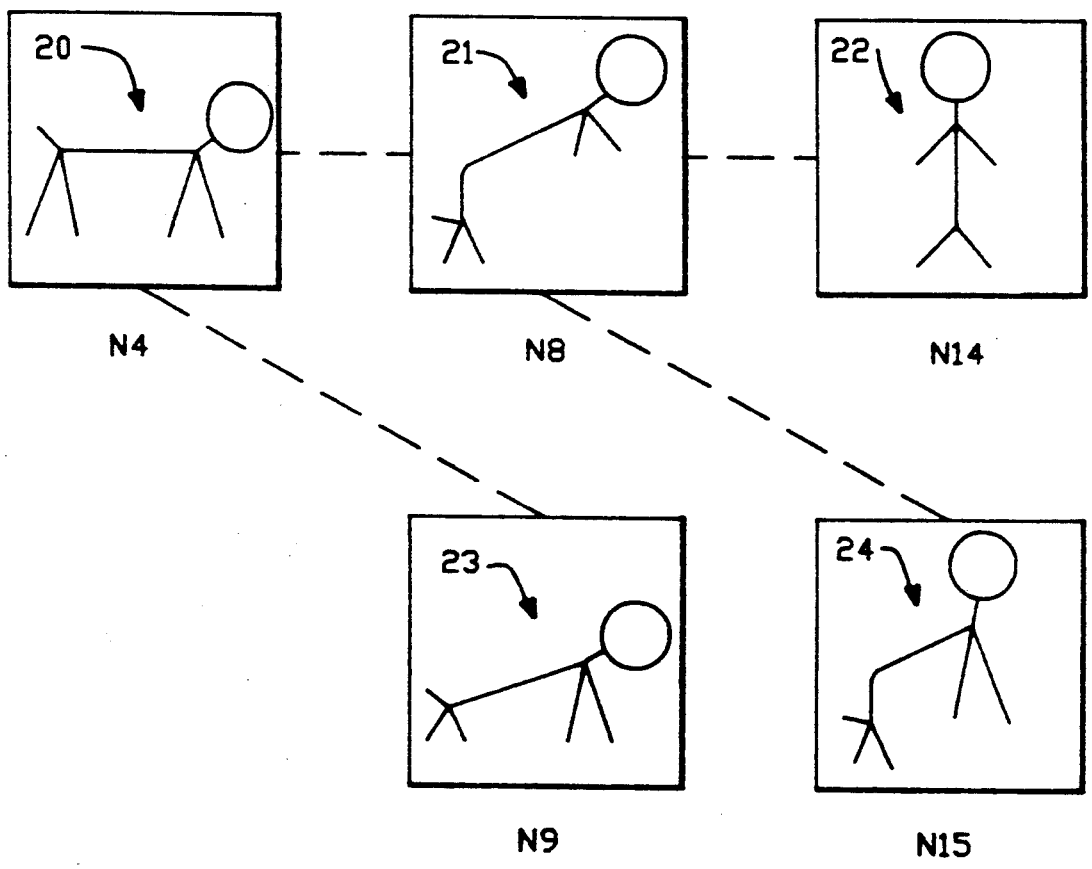
FIG. 2 is a chart illustrating video images having a virtual position in the data space of FIG. 1.

FIG. 2 illustrates a contrived set of visual images that might be stored in the data space of FIG. 1. For instance, the stick FIG. 20 at node N4 might be stored as a frame of video data. The segment between node N4 and node N8 consists of a series of visual images each stored as a frame of video data evolving from the stick FIG. 20 at node N4 to the stick FIG. 21 at node N8. Likewise, the line segment between node N8 and node N14 consists of a series of visual images evolving from the life form 21 at node N8 to the life form 22 at node N14. Likewise, the line segment between point N4 and N9 in the cladogram of FIG. 1 consists of a series of visual images evolving from life form 20 at N4 to life form 23 at N9. Similarly, the line segment between N8 and N15 in FIG. 1 consists of a series of visual images evolving from life form 21 at N8 to the life form 24 at N15.

Using the data space of FIG. 1, a display of sequences of video images could be created which follows any sequence of intersecting line segments in response to user interaction. Because the visual images at points along the line segments are all related to one another by their virtual position on the cladogram, the visual images displayed will appear to change in a manner that makes sense to the user regardless of the paths traversed in the data space.

FIG. 3 illustrates an alternative data space which could be used according to the present invention. The data space of FIG. 3 consists of nodes N0, N1, N2 and N3 and line segments S1 between nodes N0 and N1, S2 between nodes N3 and N1, S3 between nodes N3 and N1, S4 between nodes N1 and N2, S5 between nodes N0 and N3 and S6 between nodes N2 and N3. This data space consisting of a set of intersecting line segments overlays a map of the Golden Gate Bridge of San Francisco bay, with the San Francisco peninsula 30 at the south and the Marin County headlands 31 at the north. The Golden Gate Bridge stretches between the peninsulas. The virtual images displayed at each point on the line segments correspond to a view of the Golden Gate Bridge filmed from a helicopter, such as the image shown in FIG. 4 which corresponds to the point 33 on the line segment S1 between nodes N0 and N1. A sequence of visual images of the Golden Gate bridge can be created by traversing line segments in the data space in any pattern desired by the user. Each point on a line segment is related to adjacent points along the line segment by its virtual position in the data space. Because of this relationship, as the user moves along a virtual line segment, the visual image changes in increments that make sense with respect to the arbitrary data space.

B. The Display System

FIG. 5 is a block diagram of the display system implementing the present invention. The system of FIG. 5 comprises a user-programmable computer 50 such as the SMC-2000 which is provided with a Sonyview Intelligent Video System available through the Video Communications Products Division of Sony Corporation of America, Sony Drive, Park Ridge, N.J. 07656.

The computer 50 includes a port 52 adapted for receiving position displacement signals. A track ball 53 in the preferred implementation, supplies the position displacement signal across line 54 to port 52. The computer system 50 also includes a frame buffer 51 which stores a frame of bit-mapped digital data and a port for supplying RGB video data across line 55 from the frame buffer 57 to a video monitor 56. The RGB information on line 55 is displayed on the video monitor 56 to provide a view of the graphic representation of the data space, such as the cladogram of FIG. 1 or the map view of FIG. 3. In addition, in response to the visual image being displayed on the video projector 66, the computer 50 generates an indicator of the virtual position of the image being displayed on the graphic representation of the data space. Using standard techniques, this is done by writing data defining the indicator such as a small square or a cursor, to the frame buffer or by combining the output of the frame buffer with data defining the indicator. The bit map image could be replaced by a chart overlaying the screen of a display to provide better resolution in the chart if desired. Also, a large separate visual work depicting the data space could be shown to the user, with a monitor displaying only an active subset of the chart, or a computer controlled laser highlighting the virtual position on the visual work.

In addition, the computer includes three serial RS232 ports, 57, 58 and 59. The RS232 ports 57 and 58 supply video control signals to a first video disc player 60 and a second video disc player 61, respectively. In response to the control signals the video disc players supply addressed frames of video data in the NTSC format on output lines 62 and 63, respectively. A video routing switcher 64 selects the frame of video information from line 62 or 63 for supply on output line 65 to a large display video projector 66 or other means for displaying the video image. The control signal on RS232 port 59 supplies switching control information to the video routing switcher 64.

The video projector 66 is adapted to provide display of the visual images read from the data space stored on video discs at a rate of 30 frames per second. Any display technology suitable to a particular application can be used. For instance, faster frame per second rates could be used.

C. The Input Device

The input device, the track ball 53 of FIG. 5, is adapted to be displaced by a user in any direction in two dimensions. As the input device is moved, a position input signal is generated. Displacement of the track ball is accomplished by rotating the surface of the ball. As the surface of the ball moves, the position input signal provides X and Y coordinates of the changed position of the surface of the ball. This input signal is translated by the computer to a virtual position in the data space which is displayed by the video monitor 56. In addition, a control signal is generated that is supplied to the video disc players 60 and 61 across lines 57 and 58, respectively.

The track ball gives the user the ability to move in a given direction for an indefinite stretch so that long distances can be traversed in the data space. Other kinds of displacement input devices such as a mouse can be used; however, because the actual device is moved on a table, the mouse must be picked up and moved back while disabling displacement update signals in order to traverse long virtual distances in the data space.

The input devices provide a means under user control for generating position displacement information over pre-defined update intervals of time. The computer 50 samples the displacement information during each such interval to generate a next frame address and to update the virtual position in the data space relative to the virtual position of the previous interval.

Other means of generating position displacement input signals could be used in place of the mouse or track ball, such as magnetic tracking devices mounted on a wand, mounted on a user's hand or otherwise mounted in a position giving the user control over the displacement of the object during update intervals. Further, the displacement could be sampled in one, two or three dimensions, as suits a particular application.

D. Translator

The computer 50 is programmed to translate the position displacement input to a virtual position in the data space relative to a previous virtual position and mode control signals for supply to the video disc player storing the library of frames. The next address in the video disc player is generated in response to the mode control signals supplied by the translating algorithm in the computer.

The mode control signals operate to change the speed at which the video disc player increments its frame address counters to provide effective control of the next address generation by the host computer 50.

The video projector 66 is adapted to display 30 frames per second. Thus, it is preferable that the mode control signals which control the next address for display be generated 30 times per second to match the frame per second rate of the display system. It is found, however, that an update interval of at least ten times per second, i.e. once every three frames in this embodiment, is sufficient to provide the user with a feeling of tightly coupled interactivity.

Branches from one segment of images to another segment which may have addresses beyond the search capability of a disc player in one frame time are accomplished using foreground and background video disc players. Thus, the preferred embodiment of the invention as shown in FIG. 5 includes a first video disc player 60 and a second video disc player 61. The first video disc player 60 is adapted to be running in the foreground, displaying a sequence of video images along a virtual line segment in the data space. As the virtual position of the visual images approaches a node, the second video disc searches to the intersecting frame on the branch segment. Thus, as the foreground disc player 60 reaches the node, the system is able to provide one of two frames of video data in response to the position input. Each of the two frames of video data correspond to one of the branches available to the user. This eliminates the problem of existing video disc player technology in which the random access time of video frames can be a second or more for frames physically located at large distances from each other on the disc.

Obviously, for systems providing nodes that can have multiple intersecting segments, more than two video disc players can be implemented. The computer simply generates a signal on line 59 indicating the video disc player which is accessing the frame indicated by the updated virtual position and the video routing switcher 64 supplies the appropriate frame of video data to the video projector.

Other media for storing video with access speeds fast enough to provide for thirty frame per second updates (i.e., the frame per second rate of the display projector) without switching between players could be used.

The video disc players 60 and 61 are adapted to operate in discrete frame per second modes rather than providing direct addressing to the external computer. In particular, the video disc players are adapted to operate in a 0, 30 or 90 frame per second mode and a step one frame mode. The 90 frame per second mode actually addresses every third frame, 30 frames a second to provide fast traversal through the data space, but skipping two out of three frames along a segment.

In order to provide for control of the address generation in response to the position input signals, the computer generates mode control signals that toggle between the modes available in the video disc player. Thus, the preferred system updates the position input signal 30 times per second; and the mode of operation of the video disc player 60 is toggled between the step one frame mode and 0 frame per second mode depending on the position input signal during each update interval. If the position input signal has changed a sufficient amount in the update interval, a next frame address is generated by placing the video disc player in step one frame mode. If the position input signal has not changed sufficiently to translate to a change in position in the virtual data space, the video disc player is left in the 0 frame per second mode. This changing of modes between 0 frames per second and step one frame, 30 times a second, provides frame by frame control over the image displayed by the video disc player along a segment of the data space in the foreground player. Random access in the data space is provided by the background player.

When the displacement signal indicates sufficient change of position during an update interval, the mode control signal is switched to the 90 frame per second mode causing a 3 frame jump in the next address generated. Although this causes some frames in the data space to be skipped, it is advantageous to provide a means for rapidly traversing the data space.

An interactive system has also been developed in which the update interval provides for the generation of a mode control signal 15 times per second. This allows the video disc player to provide two next addresses for every update interval.

The mode of the video disc player is set 15 times per second depending on the amount of change in virtual position for each update interval. Toggling between 0 frames per second and step one frame mode provides continuous control over the number of next frame addresses per second up to 15 frame addresses per second. If the virtual position changes sufficiently in response to user input, the mode control signal will be toggled up to 30 frames per second for the update interval. In the 30 frame per second mode in this system which provides mode control signals 15 times per second, the video disc player supplies two succeeding frames of video data independently of the position input signal. For larger changes in virtual position, the mode is switched up to the 90 frame per second mode, where the video disc player also provides two frames but advances the address by increments of three for a total of six frame addresses during the update interval.

The basic control loop for the two disc player interactive video system shown in FIG. 5 includes the following steps:

1) Wait for the beginning of the next video frame time, such as may be indicated by a video sync signal (Block 601).

2) Read the current frame number from the foreground disc player (Block 602).

3) Check the background player (Block 603). Checking the background player consists of consulting the data base to determine upcoming branch points in the data space based on the virtual position of the visual image stored in the current frame of the foreground disc player. Next, the background player is controlled to address the appropriate branch point on the intersecting branch segment.

4) Read the updated position of the track ball since the last video frame time (Block 604).

5) Based on the updated track ball displacement in the X and Y directions and the current virtual position, calculate updated virtual position (Block 605). Determine whether the disc players should be switched by detecting whether the virtual position is a branch point and translating the position of the track ball to a next frame address along one of the intersecting segments (Block 606).

6) Update the appropriate video disc player motion control (Block 607 or 608) to provide the appropriate next frame address to display the next frame of video data along the appropriate segment (Block 609). Further, the data base is consulted to avoid stepping beyond the last frame in a sequence, such as at end points in the cladogram of FIG. 1.

7) Finally, the cursor on the map screen is updated to indicate the virtual position of a frame being displayed (Block 610).

The step of updating the virtual position and calculating the next frame address corresponding to Blocks 605 and 606 of FIG. 6 is largely determined by the organization of the data space. In the preferred embodiment, the data space is organized into nodes and segments. A table is created with one entry for each node in the data space. To illustrate each entry in the table, consider node N23 illustrated in FIG. 7. The entry in the database for node N23 is as follows:

Node N23:

North node=34

North frame=1221
East node=24
East frame=810
South node=N12
South frame=1221
West node=N22
West frame=810.

As can be seen, the node N23 represents two intersecting sequences of video images. The sequence going from N22 through N23 to N24 intersects the sequence going from N12 to N23 to N34 at frame 810. The sequence from N12 through N23 to N34 intersects N23 at frame 1221. Accordingly, for a sequence of video images being displayed along the east-west segment, the foreground disc player will be at frame address 810 while the background disc player will be searching to address frame 1221. When the algorithm determines whether to branch, either frame 810 or frame 1221 will be supplied, enabling the user to select one of four directions along two intersecting sequences of video images at each node.

The determination of whether to make a branch at a node is based on the displacement input signals from the track ball. The next address along the sequence of addresses is supplied by the mode control signals. These signals are calculated in response to the displacement input signal as it is projected to the virtual direction of the current segment in the data space. Thus, as the user progresses east or west along a segment from N22 to N24, to the extent that the track ball displacement includes a north-south component, that component will be disregarded. However, at a node, that component must be used to determine whether to branch. In the preferred embodiment, because the user is progressing through frames of video information along a segment at relatively high speeds compared to the user's reaction time, it is necessary to use more than one update in a row to determine whether to branch. Accordingly, the Sonyview based system accumulates the displacement information for five update intervals at a time. During the update interval at which the user reaches or passes a node, the accumulated displacement information is tested to determine whether a branch should be taken. The algorithm sums all of the X component and sums all of the Y component of the previous five samples. Assuming that the X direction corresponds to the direction in which the user is proceeding in virtual data space along the current sequence, and the Y direction corresponds to the direction of the branching segment from the given node, if two times the Y component of the accumulated displacement information is greater than the X component of the accumulated displacement information, the algorithm will branch, switching to the background player. This favors branching at nodes but is not so sensitive that the user has difficulty progressing through a node without branching. Further, this weighting of the branch direction accounts for the relatively slow reaction time of users as they approach branches with respect to the address generation algorithm.

The step of checking the background player corresponding to Block 603 of FIG. 6 is based on this data space organization. When the foreground player reaches the mid-point of a segment between two nodes, the background player will search to the node at the end of the segment corresponding to the direction of motion through the virtual data space.

A copy of source code used in the 30 frame per second embodiment is attached as an appendix in U.S. Pat. No. 4,857,902 incorporated by reference.

CONCLUSION

The present invention provides an interactive video display system providing a human operator control over the sequence of images displayed from a library of video frames. The library of video frames is organized according to a virtual space that is represented by a set of intersecting line segments where points along the line segments correspond to the virtual position of images stored in the library. Further, the frames in the library are related to one another by their virtual position in the data space so that as the operator traverses a segment or branches from one segment to another, the image being displayed will make sense with respect to that data space.

User control is provided through a displacement type input device, such as a track ball, which is sampled during update intervals. During each update interval, the virtual position of the current frame and the displacement input signal are used to calculate an updated virtual position. Based on the updated virtual position, a next frame is accessed and displayed. Further, the system includes a display presenting a graphic depiction of the data space to the operator. As the operator traverses the data space, an indicator, such as a cursor or other highlighting characteristic, moves along the segments in the data space display to provide a user with feedback concerning his location in the data space.

By translating a user's actual physical movement of the track ball into updates in virtual position in the data space over intervals which are short compared with the reaction time of the operator, a feeling of tightly coupled control over the sequence of images displayed is achieved. It is this feeling of tightly coupled control over the sequence of images that has not been achieved in prior interactive video systems that display prerecorded images.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A method for displaying image data representing a plurality of visual image of a subject, wherein each of the plurality of visual images comprises a different perspective of the subject, comprising the steps of:

organizing the plurality of visual image into a matrix in which each visual image has a position in the matrix and the perspective of each visual image is indicated by its position in the matrix;

storing a frame of image data for each visual image in a location accessible in response to the position of the visual image in the matrix;

displaying a current frame;

displaying to an operator a representation of at least a portion of the matrix;

highlighting on the displayed representation, a position in the matrix of the current frame;

providing input data indicating a change in position in the matrix and thereby a desired change in perspective of the subject;

translating the input data to an updated position in the matrix;

accessing the frame having the updated position and displaying the accessed frame as a new current frame.

2. The method of claim 1, wherein the matrix defines a virtual space having at least two dimensions.

3. The method of claim 1, wherein the step of providing input data includes operating an input device including a movable object which translates changes in position of the movable object into the input data.

4. The method of claim 3, wherein the input device comprises a track ball.

5. The method of claim 3, wherein the input device comprises a mouse.

6. The method of claim 1, wherein the input data is provided and a new current frame is displayed at least 10 times per second.

* * * * *